(12) United States Patent
Lei et al.

(10) Patent No.: US 10,523,565 B2
(45) Date of Patent: Dec. 31, 2019

(54) MOBILE DEVICE NETWORK ADDRESS SERVER UPDATE

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 15/246,675

(22) Filed: Aug. 25, 2016

(65) Prior Publication Data

US 2018/0062996 A1    Mar. 1, 2018

(51) Int. Cl.
| | |
|---|---|
| *H04W 4/14* | (2009.01) |
| *H04L 12/741* | (2013.01) |
| *H04L 12/26* | (2006.01) |
| *H04L 29/12* | (2006.01) |
| *H04W 4/40* | (2018.01) |
| *H04W 12/08* | (2009.01) |

(52) U.S. Cl.
CPC .......... *H04L 45/745* (2013.01); *H04L 43/028* (2013.01); *H04L 61/605* (2013.01); *H04W 4/14* (2013.01); *H04W 4/40* (2018.02); *H04L 61/106* (2013.01); *H04L 61/2076* (2013.01); *H04W 12/08* (2013.01)

(58) Field of Classification Search
CPC .......... H04W 12/08; H04W 4/14; H04W 4/90

USPC .............. 455/412.1, 414.1, 414.2
See application file for complete search history.

(56) References Cited

U.S. PATENT DOCUMENTS

| | | | |
|---|---|---|---|
| 8,583,765 B1 * | 11/2013 | Rachabathuni ....... | H04W 76/10 709/219 |
| 2014/0156788 A1 | 6/2014 | Lewis et al. | |
| 2015/0024688 A1 | 1/2015 | Hrabak et al. | |
| 2015/0245186 A1 | 8/2015 | Park et al. | |
| 2016/0068123 A1 * | 3/2016 | Helmhold ................ | B60H 1/00 701/2 |
| 2017/0339095 A1 * | 11/2017 | Lei .......................... | H04L 41/12 |

* cited by examiner

*Primary Examiner* — Sam Bhattacharya
(74) *Attorney, Agent, or Firm* — Michael J. Spenner; Brooks Kushman P.C.

(57) ABSTRACT

A telematics control unit (TCU) receives a short message service (SMS) message from a phone number of a mobile device and identifies an updated network address of the mobile device from the message. The TCU sends the updated network address of the mobile device to a packet data network (PDN) server configured to route data traffic between the network address of the mobile device and the vehicle. The PDN server communicates over a data network with a telematics control unit (TCU) of a vehicle and maintains a list of identification numbers of mobile devices and corresponding network addresses of the mobile devices for the TCU. The PDN server receives an updated network address associated with an identification number of a mobile device from the TCU; and updates the list with the updated network address of the mobile device.

19 Claims, 10 Drawing Sheets

MOBILE DEVICE NETWORK ADDRESS SERVER UPDATE

TECHNICAL FIELD

The present disclosure relates to using a vehicle telematics control unit (sometimes referred to as a TCU) to update a mobile device network address stored on a packet data network (PDN) server.

BACKGROUND

Remote vehicle service requests, such as door lock and unlock, may be passed through a backend telematics server. The backend telematics server receives the service request, and issues a control command to the telematics control unit of the vehicle. The command may be issued over a cellular communication channel to the telematics control unit of the vehicle. The backend telematics server may be operated by the automobile manufacturer, and may be associated with ongoing operational and maintenance costs to the manufacturer.

SUMMARY

In one or more illustrative embodiments, a vehicle system includes a telematics control unit (TCU) of a vehicle programmed to receive a short message service (SMS) message from a phone number of a mobile device; identify an updated network address of the mobile device from the message; and send the updated network address of the mobile device to a packet data network (PDN) server configured to route data traffic between the network address of the mobile device and the vehicle.

In one or more illustrative embodiments, a packet data network (PDN) server is programmed to communicate over a data network with a telematics control unit (TCU) of a vehicle; maintain, for the TCU, an association of identification numbers of mobile devices with corresponding network addresses of the mobile devices; receive, from the TCU, an updated network address associated with an identification number of a mobile device; and update the association with the updated network address of the mobile device.

In one or more illustrative embodiments, a method for updating a network address of a mobile device on a server includes receiving, by a telematics control unit (TCU), a message sent from a mobile device; processing the message by the TCU to obtain an updated network address associated with an identification number of the mobile device; and sending the updated network address from the TCU to the server, to provide the server with the updated network address of the mobile device.

The details of one or more implementations are set forth in the accompanying drawings and the description below. Other features and advantages will become apparent from the description, the drawings, and the claims.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A telematics scheme may be implemented without use of a backend telematics server. Instead, a telematics control unit (sometimes referred to as a TCU) of a vehicle may utilize an on-board web server to control telematics functions according to network traffic directed to the vehicle. The onboard web server may monitor incoming network traffic for network connections from mobile devices. In an example, the network connection may be a cellular connection over a cellular communications network. In another example, the network connection may be a local connection between the mobile device and the vehicle, such as over a Wi-Fi network. When a connection is received, the vehicle firewall may validate the mobile device (e.g., via MAC address, paired device data, etc.) to ensure that the mobile device has permission to access the web server. If the connection is validated, the web server may perform further authentication of the mobile device or the user of the mobile device. In an example, the web server of the vehicle may request a certificate from the mobile device, and the mobile application may send a certificate of the mobile device to the web server for verification. Additionally or alternately, a username, password, gesture, fingerprint, or other verification may be utilized for authentication.

As a further verification, the vehicle telematics control unit utilizes network address filtering to only allow traffic from predefined network addresses of mobile devices (e.g., IP addresses) to reach the web server. To facilitate the filtering, the telematics control unit maintains a list of network addresses for each mobile device number used to access the web server. The telematics control unit may use this list of corresponding network addresses to ensure that the address of incoming web traffic is from a mobile device that is authorized.

However, as time passes or as the user travels, the mobile device may receive different network addresses from the cellular network. Sometimes, a portion of the network address can be the same, such as the block or sub-block corresponding to the user's carrier or service provider. Other times, such as when the mobile device is roaming from one carrier to another, the entire IP address of the mobile device may change.

To keep the vehicle updated to the current network address of the mobile device, a mobile application executed by the mobile device may be configured to monitor the current network address of the mobile device. When a change is detected, the application sends the updated address to the telematics control unit of the vehicle. In an example, the application encrypts the new network address in a binary short message service (SMS) message.

When an SMS message is received by the vehicle telematics control unit, the telematics control unit first validates whether the SMS message originated from a phone number on the list of paired devices. If not, the telematics control unit rejects the SMS message. If so, the telematics control unit retrieves the network address in the message. This may include performing decryption of the contents of the SMS message. Once received and decrypted, the telematics control unit looks up the network address filtering settings and updates the corresponding network address for the phone number. Once the list is updated, the user can access the web server in the vehicle according to the specified network address.

In many cellular networks, a packet data network (PDN) server may be used to route data traffic between the vehicle and the mobile device. This may be done to prevent unsolicited TCU-terminated traffic from the Internet from passing to the vehicle. Using the PDN, after the user's mobile device sends a remote command to a vehicle telematics control unit, the mobile device may attempt to initiate data traffic such as TCP/IP/HTTP traffic to the server.

As a further security measure, a PDN server may be used to control the data traffic between the user's mobile device and the telematics control unit of the vehicle to filter unauthorized access. The PDN server maintains a list of mobile phone numbers and IP addresses for a specific telematics control unit, and uses this list to validate legitimate data traffic from the network to that telematics control unit. However, once the network address of the mobile device is changed, later attempts by the mobile device to access the vehicle may be blocked by the PDN. To allow for the list stored in the PDN to be updated to allow the user to access the web server in the vehicle according to the specified network address, the telematics control unit sends the new network address and the associated phone number of the user's mobile device to the PDN server to update the list.

Once the list in the PDN server is updated, the user may utilize the mobile application or another application installed to the user's mobile device to display an access portal hosted by the web server. In an example, the mobile application may be a web browser application. In another example, the mobile application may be an application specially-configured to interact with on-board vehicle web servers (e.g., the mobile application providing the network address updates). In yet another example, the web server may initiate a network connection to the mobile device. Regardless of approach, the access portal may allow the user to select telematics functions to be performed or to execute applications installed to the web server. In an example, the user may use the portal to select a key fob application, and from the key fob application request that a "door unlock" command be performed by the vehicle. To perform a telematics function, a remote service request may be sent from the user's mobile device over the network connection to the web server of the telematics control unit.

When the command is received by the web server, and authentication of the mobile device is successful, the web server may send the command to vehicle controllers to perform the requested function. In an example, the telematics control unit may be connected to a vehicle bus, and the web server may cause the telematics control unit to send a message over the vehicle bus to a controller to perform the requested action. Continuing with the key fob example, the telematics control unit may send a "door unlock" command to the vehicle body controller to perform the requested action (e.g., a door unlock action). Responsive to sending the command, the telematics control unit may receive a command result from the body controller. The command result may include information, such as whether the command was successful, and/or a new status of the body controller responsive to the command (e.g., that one or more doors are unlocked). The web server may send the command results to the mobile device responsive to the "door unlock" command request.

Figure 1:
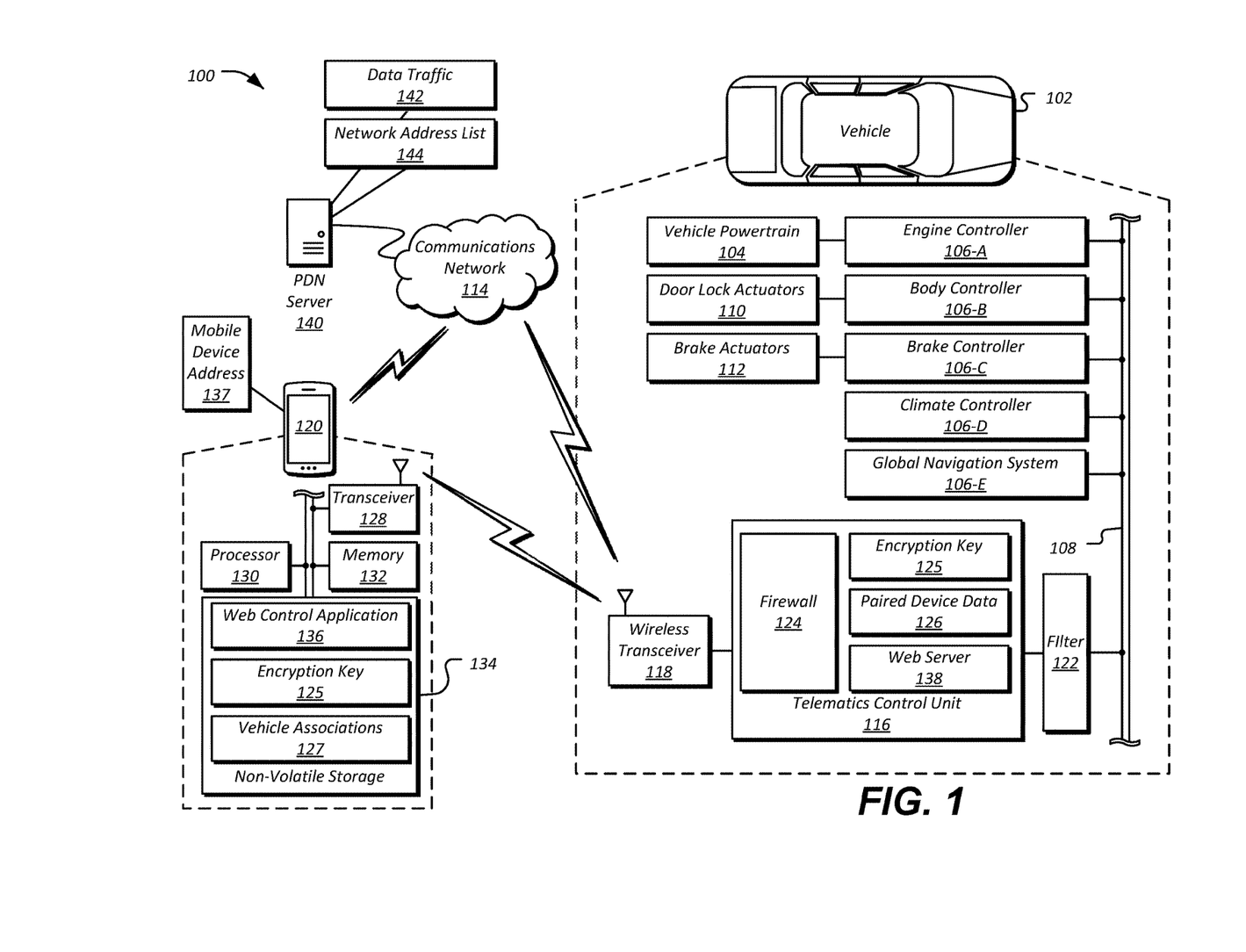
FIG. 1 illustrates an example system including a vehicle having an on-board web server controllable by a remote service application of a mobile device.

FIG. 1 illustrates an example system 100 including a vehicle 102 having an on-board web server 138 controllable by a web control application 136 of a mobile device 120. As illustrated, the vehicle 102 includes a vehicle powertrain 104 connected to one or more vehicle wheels to propel the vehicle, and a plurality of vehicle ECUs 106 in communication over one or more vehicle buses 108 to control the vehicle powertrain 104 and other vehicle 102 functions. These vehicle functions may include vehicle door lock actuators 110 or brake actuators 112, for example. The vehicle 102 also includes a telematics control unit 116 having a firewall 124, encryption keys 125, and paired device data 126 for mobile devices 120 configured to communicate with the telematics control unit 116 via a wireless transceiver 118. The telematics control unit 116 may also be connected to the vehicle bus 108 through a filter 122. The system 100 also includes a mobile device 120 having a web control application 136, encryption keys 125, and vehicle associations 127. The mobile device 120 may be in communication over a communications network 114 at a mobile device address 137. The PDN server 140 may receive data traffic 142 from the mobile device 120, and validate the legitimacy of the data traffic 142 using a network address list 144, thereby allowing the web control application 136 to communicate with the telematics control unit 116 upon the success of the validation. Accordingly, the PDN server 140 may allow data traffic from an authorized mobile device to pass through and block data traffic originated from an unauthorized source. The mobile device 120 may use the vehicle associations 127 to update the telematics control unit 116 to the current mobile device address 137 of the mobile device 120. While an example system 100 is shown in FIG. 1, the example components illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane, rickshaw, skateboard, bike, drone, or other mobility implement for transporting people and/or goods. The vehicle powertrain 104 may include one or more engines or motors configured to supply the motive force to propel the vehicle 102. In an example, the vehicle 102 may be powered by an internal-combustion engine coupled to the drive wheels via a transmission to a differential. In another example, the vehicle 102 may be a hybrid electric vehicle (HEV) powered by both an internal combustion engine and one or more electric motors, such as a series hybrid electric vehicle (SHEV), a parallel hybrid electric vehicle (PHEV), a parallel/series hybrid electric vehicle (PSHEV), or a compressed natural gas (CNG) engine vehicle. As the type and configuration of vehicle 102 may vary, the capabilities of the vehicle 102 may correspondingly vary. As some other possibilities, vehicle 102 may have different capabilities with respect to cargo capacity, passenger capacity, and towing ability.

The vehicle 102 may include a plurality of electronic control units (ECUs) 106 configured to perform and manage various vehicle 102 functions under the power of the vehicle battery and/or drivetrain. As depicted, the example vehicle ECUs 106 are represented as discrete ECUs 106-A through 106-F. However, the vehicle ECUs 106 may share physical hardware, firmware, and/or software, such that the functionality from multiple ECUs 106 may be integrated into a single ECU 106, and that the functionality of various such ECUs 106 may be distributed across a plurality of ECUs 106. The vehicle ECUs 106 may include various vehicle 102 components configured to receive updates of associated software, firmware, or configuration settings.

As some examples, an engine controller ECU 106-A may be configured to provide for monitoring and control of the vehicle powertrain 104. A body controller ECU 106-B may manage various power control functions such as exterior lighting, interior lighting, keyless entry, door lock actuators 110 to lock and unlock vehicle doors, remote start, and point of access status verification. A brake controller 106-C may be configured to communicate with brake actuators 112 or other vehicle 102 safety systems. A climate controller ECU 106-E may be configured to provide control of heating and cooling system components (e.g., compressor clutch, blower fan, temperature sensors, etc.) to manage climate in cargo and/or passenger compartments. A global navigation satellite system (GNSS) controller ECU 106-F may be configured to provide vehicle location information using a system such as the U.S. global positioning system (GPS), the European Galileo system, the Russian GLONASS system, or the Chinese Compass/Beidou system.

The vehicle bus 108 may include various methods of communication available between the vehicle ECUs 106. As some non-limiting examples, the vehicle bus 108 may include one or more of a vehicle controller area network (CAN), an Ethernet network, and a media oriented system transfer (MOST) network.

The telematics control unit 116 may be configured to provide telematics services to the vehicle 102. These services may include, as some non-limiting possibilities, navigation, turn-by-turn directions, vehicle health reports, local business search, accident reporting, and hands-free calling. To support these and other telematics services, the telematics control unit 116 may utilize network hardware configured to facilitate communication between the vehicle ECUs 106 and with other devices of the system 100. The telematics control unit 116 may also include computing hardware in support of the performance of the functions of the telematics control unit 116 discussed herein. This computing hardware may include, as some possibilities, one or more processors configured to execute instructions loaded to a memory from a storage medium.

In an example, telematics control unit 116 may utilize the modem services of a wireless transceiver 118 for communication over the communications network 114. In another example, the wireless transceiver 118 may be configured to communicate over one or more of BLUETOOTH, Wi-Fi, and wired USB with a mobile device 120 of a user. The wireless transceiver 118 may include network hardware configured to facilitate communication over the communications network 114 between the vehicle 102 and other devices of the system 100. The communications network 114 may include one or more interconnected communication networks such as the Internet, a satellite link network, a local area network, a wide area network, a wireless local area network (WLAN) including dedicated short range communication (DSRC), a cellular network, and a telephone network, as some non-limiting examples.

To ensure secure functional separation of the telematics control unit 116 from the vehicle bus 108 communications of the vehicle ECUs 106, the telematics control unit 116 may be configured to send remote commands to the vehicle bus 108 through a filter 122. The filter 122 may implement a command validator to prevent commands from being requested by the web control application 136 that could place the vehicle 102 in a state inappropriate for the performance of repair or diagnostic actions, such as filtering out requests commanding an electric vehicle 102 to switch out of park, releasing a parking brake, commanding a park-pawl actuator, or other operations related to putting the vehicle 102 in a motive or potentially motive state.

The firewall 124 may implement address filtering to prevent commands from being requested by the web control application 136 of an illegitimate mobile device 120. This address filtering may include, for example, filtering out messages from network addresses of unknown mobile devices 120. The firewall 124 may accordingly implement validation functionality to ensure that the mobile devices 120 are authorized to use the telematics control unit 116 functionality of the vehicle 102. Alternatively, the address filtering and validation may be implemented at the web server 138 instead of and/or in addition to the firewall 124.

A mobile device 120 may undergo a process the first time the mobile device 120 is connected to the telematics control unit 116, in which the telematics control unit 116 scans for mobile devices 120, and the user manually confirms an identification of the mobile device 120 to be connected to the telematics control unit 116. This process may be referred to as pairing. The telematics control unit 116 may maintain paired device data 126 indicating device identifiers or other information regarding mobile devices 120 that have been previously paired with the telematics control unit 116. Similarly, the mobile device 120 may maintain vehicle associations 127 indicating vehicle identifiers or other information of the vehicles 102 to which the mobile devices 120 has been paired. The mobile device 120 and telematics control unit 116 may further create and/or share encryption keys 125 that may be used for encryption and decryption of messages between the mobile device 120 and the telematics control unit 116. Once the pairing process is performed, the telematics control unit 116 may utilize the paired device data 126 to automatically reconnect to the mobile device 120 when the mobile device 120 is identified via the wireless transceiver 118 as being in proximity of the telematics control unit 116.

The paired device data 126 may be extended to further include or be associated with a list of network addresses for each mobile device 120 phone number entry in the paired device data 126 used to access the web server. The telematics control unit 116 may use this list of corresponding network addresses to ensure that the network address of incoming web traffic is from a mobile device 120 that is authorized. For example, when a request is received from a mobile device 120, the firewall 124 may access the paired device data 126 to confirm that the network address is an address included in the paired device data 126.

The mobile devices 120 may be any of various types of portable computing devices, such as cellular phones, tablet computers, smart watches, laptop computers, portable music players, or other devices capable of communication over the communications network 114. In an example, the mobile devices 120 may communicate with the communication network 114 and with the wireless transceiver 118 of the vehicle 102 using a modem or transceiver 128. The mobile devices 120 may include one or more processors 130 configured to execute instructions of mobile applications loaded to a memory 132 of the mobile device 120 from storage medium 134 of the mobile device 120. The web control application 136 may be an example of a mobile application installed to the mobile device 120. The web control application 136 may be configured to receive input (e.g., user input to a user interface of the mobile device 120), and send commands to the vehicle 102 via the telematics control unit 116, as discussed in greater detail below.

To keep the telematics control unit 116 updated to the current network address 137 of the mobile device 120, the web control application 136 may be further configured to monitor the current network address 137 of the mobile device 120. When a change is detected, the web control application 136 sends the updated address 137 to the telematics control unit 116 of the vehicle. In an example, the web control application 136 encrypts the new network address 137 in a binary short message service (SMS) message, and sends the encrypted SMS message to the telematics control unit 116.

When the SMS message is received by the telematics control unit 116, the telematics control unit 116 first validates whether the SMS message originated from a phone number of a mobile device 120 on the list of paired device data 126. If not, the telematics control unit 116 rejects the SMS message. If, however, the phone number is listed, the telematics control unit 116 retrieves the network address 137 encoded in the SMS message. This may include performing decryption on the contents of the SMS message. Once received and decrypted, the telematics control unit 116 removes any network addresses 137 previously associated with the phone number in the paired device data 126 and associates the newly received network address 137 with the phone number. In one example, the mobile device address 137 is an IPv4 address. In another example, the mobile device address 137 is an IPv6 address. Once the list is updated, the network address 137 of the mobile device 120 may now be used to communicate with the web server 138 in the vehicle using the network address 137 of the mobile device 120.

When the mobile device 120 communicates with the telematics control unit 116 of the vehicle 102 via the communications network 114, the network address list 144 of the PDN server 140 also needs to be updated with the current mobile device address 137. This is because the data traffic 142 originated from the mobile device 120 passes through the PDN server 140 to reach the wireless transceiver 118 of the telematics control unit 116. To update the network address list 144, the telematics control unit 116 sends the new network address 137 associated with the phone number of the mobile device 120 to the PDN server 140 through the communications network 114. Once received, the PDN server 140 removes any network addresses 137 previously associated with the phone number of the mobile device 120 and stores the newly updated network addresses 137 in the network address list 144. In some examples, the network address 137 of the mobile device 120 is encrypted before being sent to the PDN server 140. In some examples, the PDN server 140 may send a confirmation message to the telematics control unit 116 upon the success of the network address list 144 update.

The web server 138 may include various types of computing apparatus including a memory on which computer-executable instructions may be maintained, where the instructions may be executable by one or more processors of the computing device. The web server 138 may be configured to maintain an access portal accessible to mobile devices 120 over the communication network 114. In an example, the web server 138 may be configured to provide the access portal to devices connected to the web server 138 via the wireless transceiver 118. As another possibility, the web server 138 may execute a server application that may be accessed by a dedicated client application of a connecting mobile device 120. Accordingly, the access portal of the web server 138 may provide a user interface to the mobile devices 120 allowing the mobile devices 120 to request telematics commands.

The web server 138 may perform authentication of the mobile devices 120 to ensure that the mobile devices 120 have permission to access the provided user interface. If the authentication is successful, the web server 138 may send the requested telematics commands (e.g., a "door unlock" command) to the vehicle bus 108 for routing and processing. The web server 138 may also send command results to the mobile device 120 responsive to the command request.

The PDN server 140 may include various types of computing apparatus, such as a computer workstation, a server, a desktop computer, a virtual server instance executed by a mainframe server, or some other computing system and/or device. Similar to the mobile device 120, the PDN server 140 may generally include a memory 132 on which computer-executable instructions may be maintained, where the instructions may be executable by one or more processors 130 (only one of which is shown for clarity). Such instructions and other data may be stored using a variety of computer-readable media. A computer-readable medium (also referred to as a processor-readable medium or storage 134) includes any non-transitory (e.g., tangible) medium that participates in providing data (e.g., instructions) that may be read by a computer (e.g., by the processor 130 of the PDN server 140 or mobile device 120). In general, processors 130 receive instructions, e.g., from the memory 132 via the computer-readable storage medium 134, etc., and execute these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Objective C, Fortran, Pascal, Visual Basic, Java Script, Perl, Python, PL/SQL, etc.

The network address list 144 may include routable network addresses of mobile devices 120 that are connected to the communications network 114. In an example, the network addresses may include Internet Protocol version 6 (IPv6) addresses or Internet Protocol version 4 (IPv4) addresses. The PDN server 140 may be configured to maintain an association of the network addresses 137 of the mobile devices 120 with identifiers of the telematics control units 116 of the vehicles 102. The identifiers of the telematics control units 116 may include various types of unique identifiers that are associated with the vehicles 102. In an example, the identifiers of the telematics control units 116 may be vehicle identification number (VIN) serial numbers that are assigned to vehicles 102 by vehicle manufacturers in accordance with ISO 3833. As some other examples, the identifiers of the telematics control units 116 may include identifiers of user accounts associated with the vehicles 102, such as MYFORD MOBILE user account identifiers, e-mail addresses, or unique codes installed to the telematics control unit 116 or the wireless transceiver 118 of the vehicle 102.

The PDN server 140 may also be configured to maintain an association of the network addresses 137 and the mobile device numbers of the mobile devices 120. In one example, the telematics control unit 116 is identified by a phone number of the wireless transceiver 118. In another example, the telematics control unit 116 is identified by a vehicle address such as IPv6 or IPv4 address.

When the mobile device 120 intends to send a command to the telematics control unit 116 of the vehicle 102 to perform a function (e.g. door lock or unlock) via communications network 114, the data traffic 142 of that command is routed to the PDN server 140 for authentication. Responsive to receiving the data traffic 142, the PDN server 140 authenticates the data traffic 142 by comparing the network address 137 of the mobile device 120 with addresses stored in the network address list 144. For instance, the PDN server 140 may identify whether the originating address of the request matches to a network address 137 specified on the network address list 144 as being associated with the telematics control unit 116 destination of the data traffic 142. If a match is found, the PDN server 140 may allow the data traffic 142 to pass through to the vehicle 102 destination, e.g., the telematics control unit 116. If, however, the PDN server 140 fails to find a match in the network address list 144, the PDN server 140 may block this data traffic 142.

In some examples, the PDN server 140 may also use the mobile device number of the mobile device 120 to notify the mobile device 120 of authentication failures. For instance, the PDN server 140 may send a message to the mobile device 120 indicating the success and/or failure of the authentication. In one example, the PDN server 140 is configured to send a message to the telematics control unit 116 indicating the mobile device 120 is attempting to send a command to the vehicle when the authentication fails.

To save battery charge or to meet key-off load requirements, the web server 138 may discontinue operation during certain conditions, such as when the vehicle 102 is off. In some cases, the user of the mobile device 120 may desire to send a command request when the web server 138 is in a deactivated state. To re-activate the web server 138, the mobile device 120 may send a wake-up message to the telematics control unit 116 of the vehicle 102. For instance, the mobile device 120 may attempt to form a network connection to the web server 138 of the vehicle 102, and if the web server 138 does not respond within a predetermined timeout period, the mobile device 120 may send the wake-up message to the vehicle 102. In an example, the wake-up message may be a short message service (SMS) message sent to a phone number or other identifier of the wireless transceiver 118 over a cellular connection (i.e., other than the vehicle address 144). Responsive to receipt of the wake-up message, the telematics control unit 116 may wake up the on-board web server 138. The telematics control unit 116 may further send a return message over SMS in response to the wake-up message, e.g., when the web server 138 is re-activated and available for use. Responsive to receipt of the return message, the mobile device 120 may again send a command to the web server 138 via communications network 114.

Figure 2A:
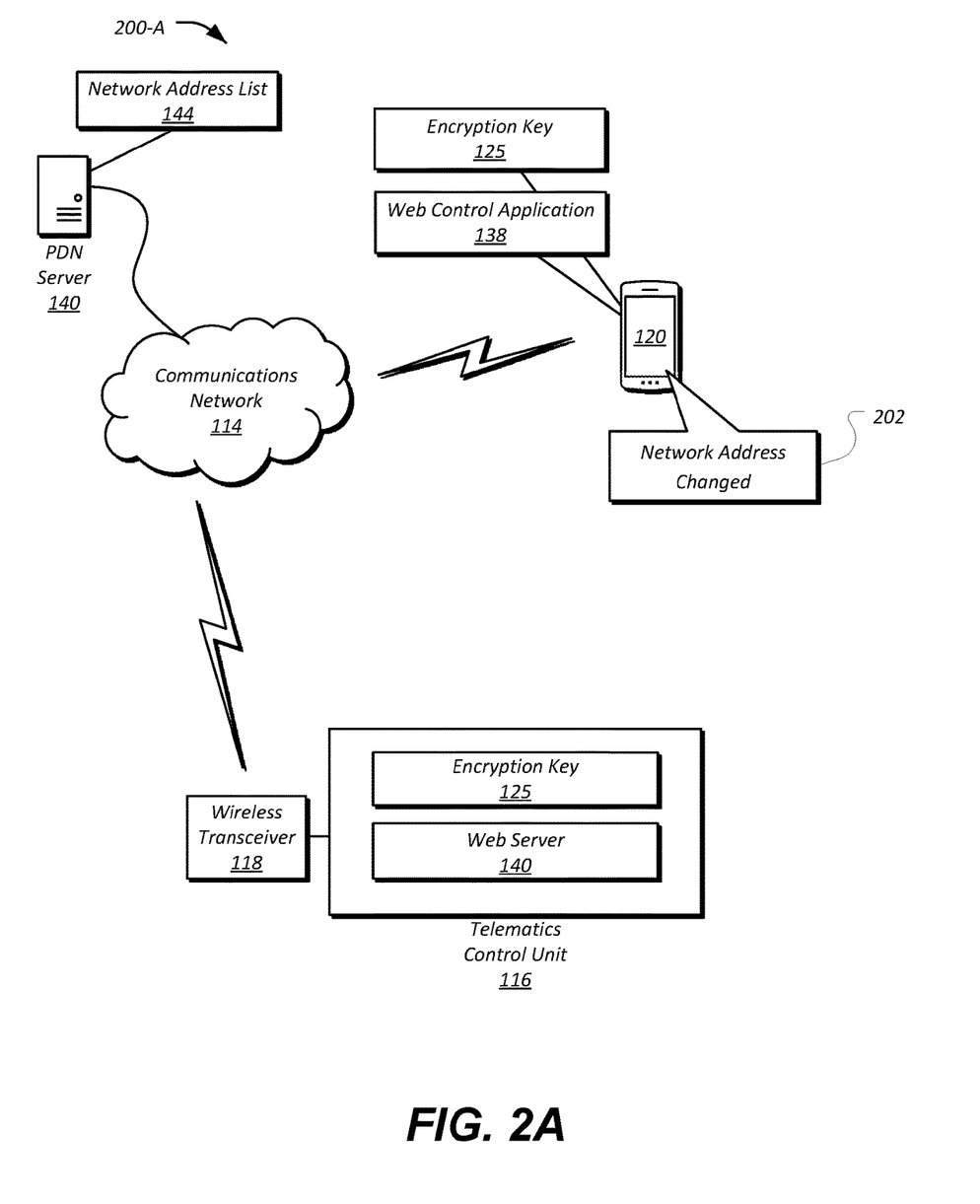
FIG. 2A illustrates an example diagram of the mobile device identifying a change in the network address of the mobile device.

FIG. 2A illustrates an example diagram 200-A of the mobile device 120 identifying a change 202 in the network address 137 of the mobile device 120. In an example, the mobile device 120 may query the current network interface status of the transceiver 128 to determine whether the network address 137 has changed. The querying may be performed periodically (e.g., every minute, every second, etc.) or responsive to various events (e.g., after a predetermined timeout has expired, after a predetermined distance has been traveled, etc.). In another example, the mobile device 120 may set up a notification callback with the transceiver 128, and may receive a callback notification responsive to the network address 137 having been changed.

Figure 2B:
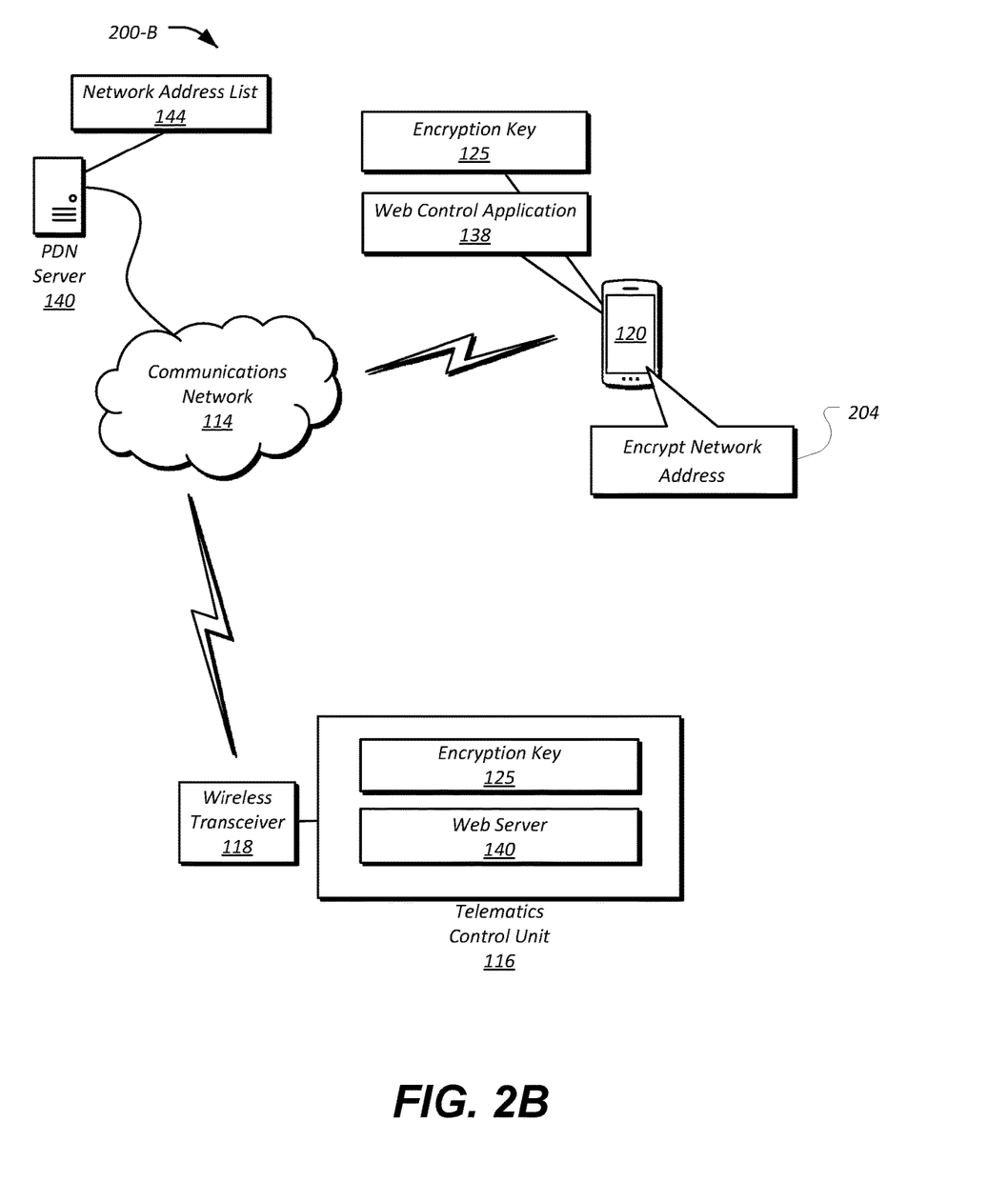
FIG. 2B illustrates an example diagram of the mobile device encrypting the network address of the mobile device.

FIG. 2B illustrates an example diagram 200-B of the mobile device 120 encrypting the network address 137 of the mobile device 120. In an example, responsive to the determination of the updated network address 137 as illustrated in the diagram 200-A, the mobile device 120 utilizes an encryption key 125 stored to the mobile device 120 to encrypt 204 the network address 137.

In an example, the encryption may be performed by using an encryption algorithm and the encryption key 125 to generate an encrypted version of the network address 137. In some examples, the encryption algorithm may be a symmetric encryption algorithm where the mobile device 120 and the telematics control unit 116 share the same encryption key 125. Example symmetric key encryption algorithms may include AES, Blowfish, DES, Serpent, and Twofish, as some possibilities. In other examples, the encryption algorithm may be an asymmetric encryption algorithm, such as public-key cryptography, in which the mobile device 120 and the telematics control unit 116 use pairs of keys for encryption and decryption of messages.

Regardless of approach, the encrypted version of the network address 137 may be encoded using binary SMS in order to pass the value to the recipient. Binary SMS may involve sending data using SMS messages set as protocol description unit (PDU), not as text. When using PDU mode, a sender may be able to send binary data messages rather than pure text.

Figure 2C:
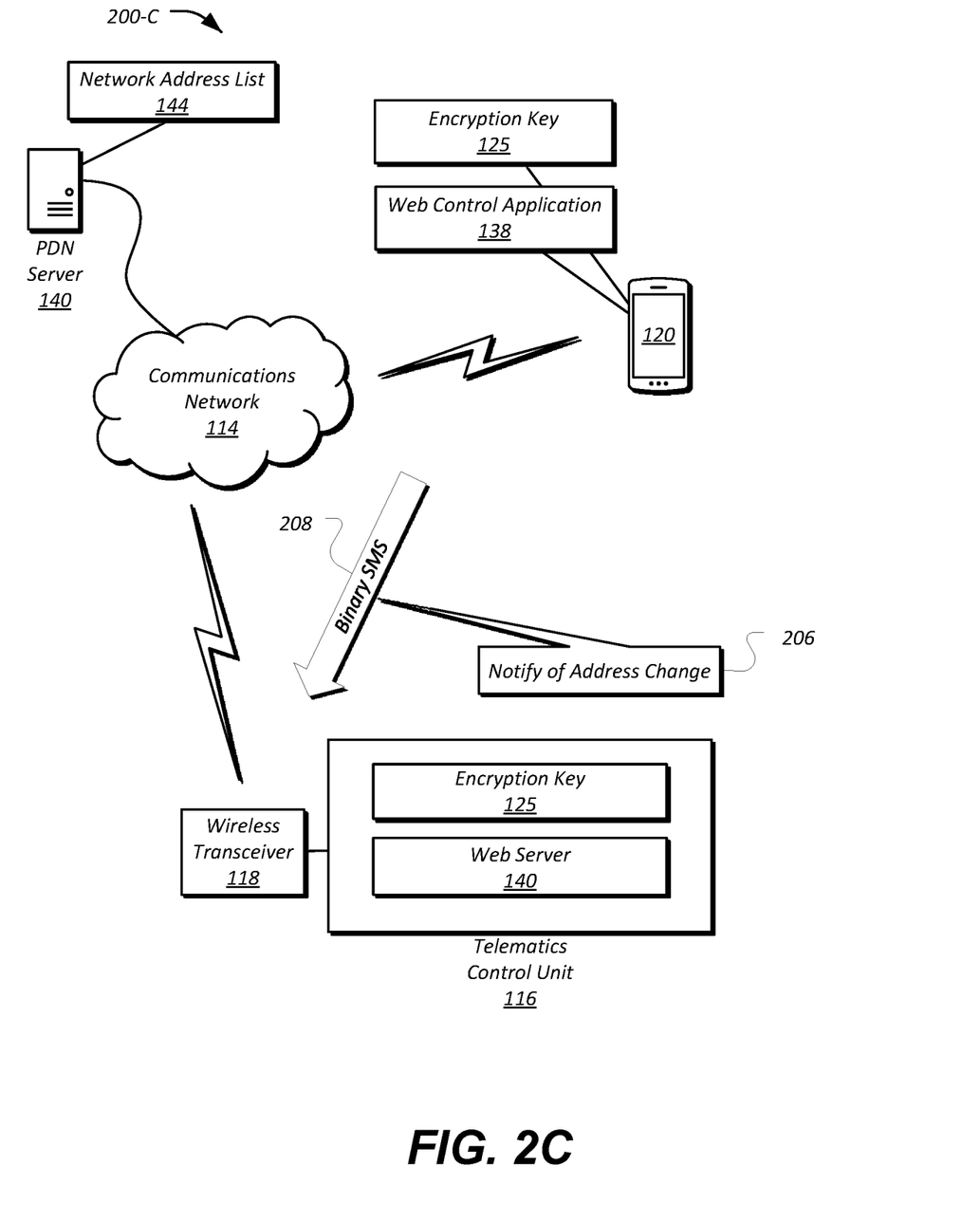
FIG. 2C illustrates an example diagram of the mobile device notifying the telematics control unit of the updated network address of the mobile device.

FIG. 2C illustrates an example diagram 200-C of the mobile device 120 notifying the telematics control unit 116 of the updated network address 137 of the mobile device 120. In an example, responsive to completion of the encryption as illustrated in the diagram 200-B, the mobile device 120 sends a notification 206 of the change in network address 137 to each telematics control unit 116 identified by the vehicle associations maintained by the mobile device 120. For instance, the mobile device 120 may include the phone numbers of telematics control units 116 that are paired for control by the mobile device 120, and the mobile device 120 may send notification messages 206 (e.g., via binary SMS 208) to the phone numbers of each of the associated telematics control units 116. The notification messages 206 may include the encrypted network address 137 of the transceiver 128 of the mobile device 120.

Figure 2D:
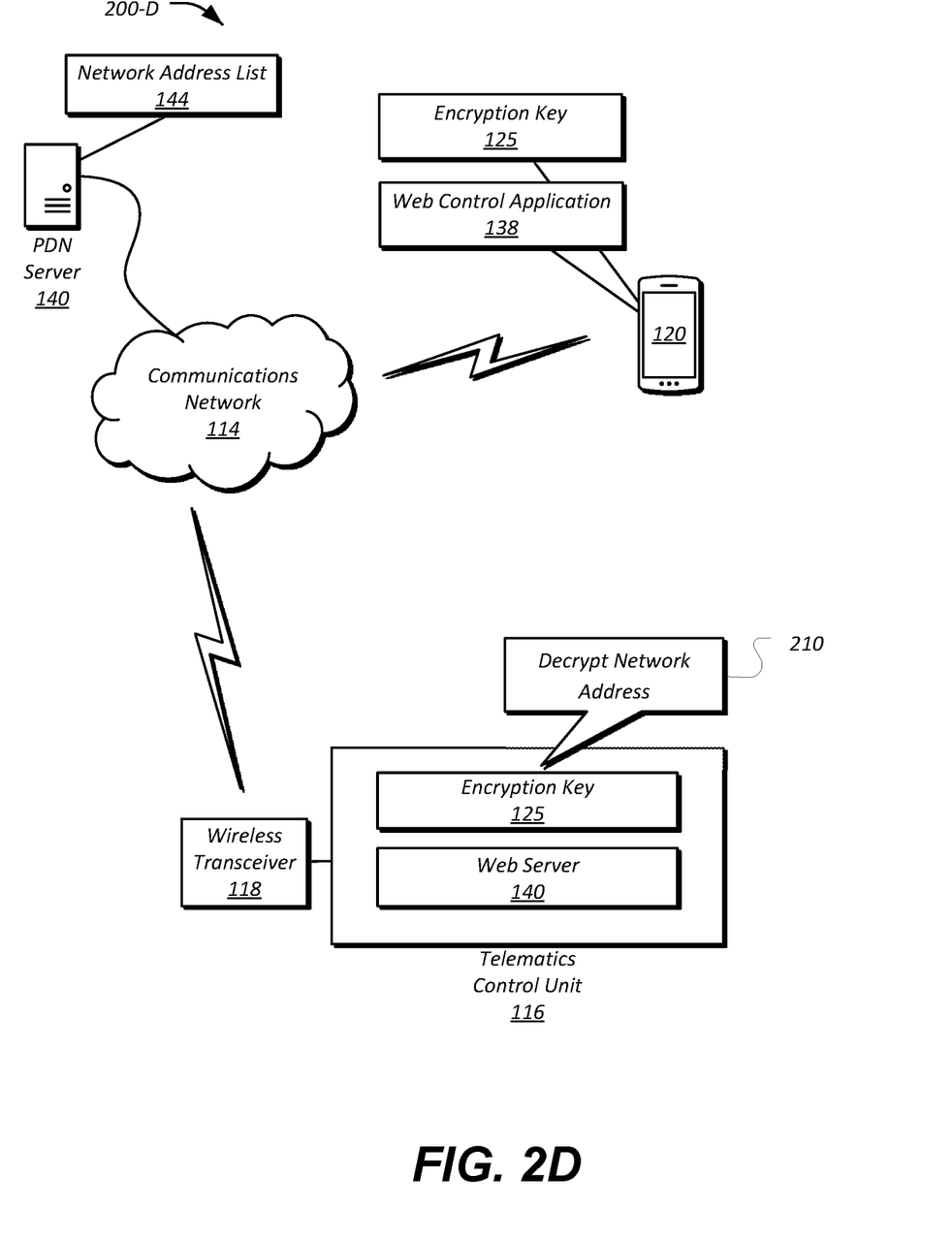
FIG. 2D illustrates an example diagram of the telematics control unit decrypting the network address of the mobile device.

FIG. 2D illustrates an example diagram 200-D of the telematics control unit 116 decrypting the network address 137 of the mobile device 120. In an example, responsive to the receipt of the notification message 206 as illustrated in the diagram 200-C, the telematics control unit 116 utilizes the encryption key 125 stored to the telematics control unit 116 to decrypt 210 the network address 137. In some examples, each mobile device 120 maybe associated with a different encryption key 125. If so, the telematics control unit 116 may store the encryption keys 125 indexed according to phone number, and may utilize the encryption key 125 associated with the origination phone number of the notification message 206 to decrypt the notification message 206.

Figure 2E:
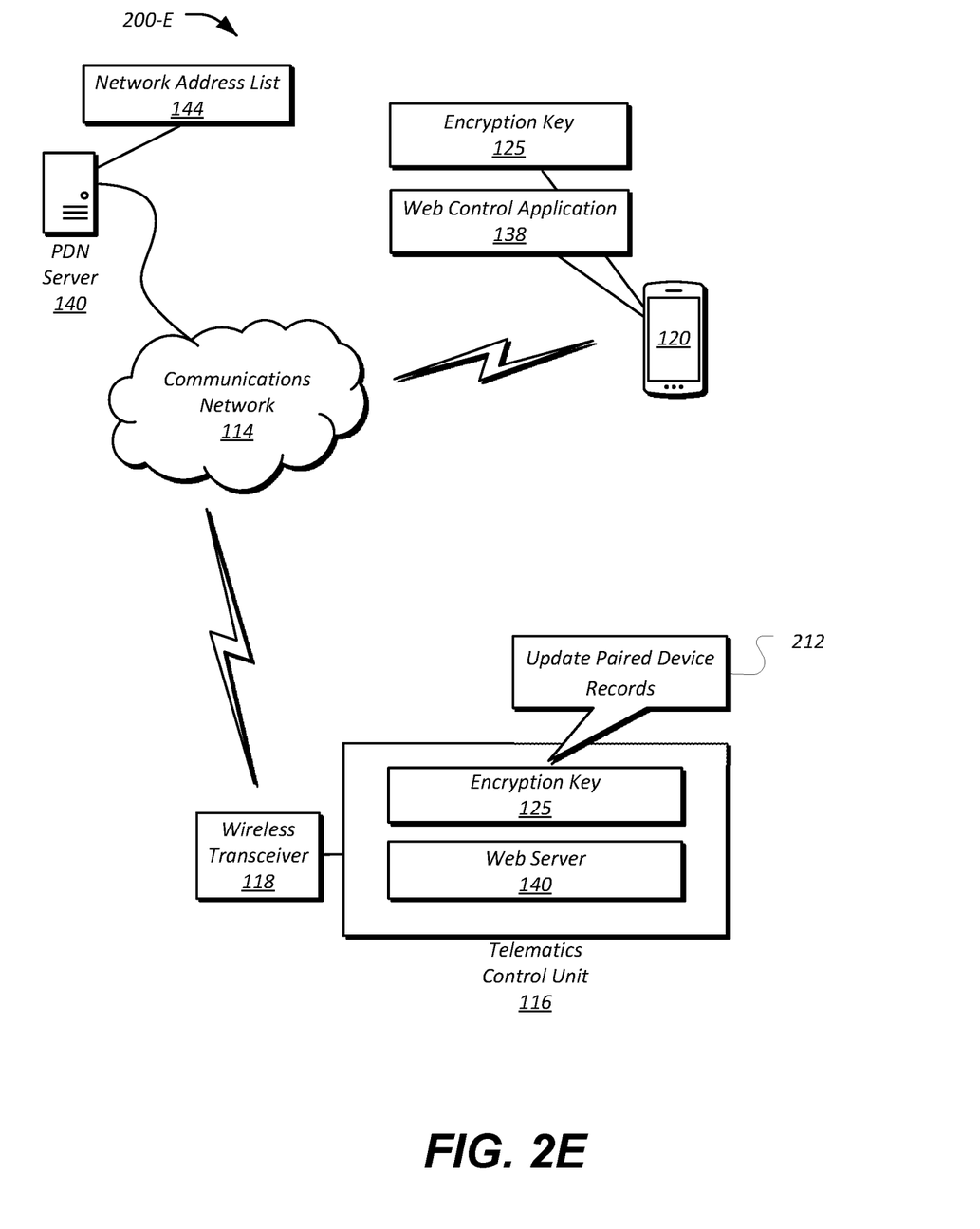
FIG. 2E illustrates an example diagram of the telematics control unit updating the paired device data of the updated network address of the vehicle.

FIG. 2E illustrates an example diagram 200-E of the telematics control unit 116 updating the paired device data 126 of the updated network address 137 of the vehicle 102. Responsive to decrypting 210 the notification message 206 as illustrated in the diagram 200-D, the telematics control unit 116 updates 212 paired device data 126 to include the new network address 137 of the mobile device 120. Previously stored network addresses 137 for the mobile device 120 may, in some examples, be removed.

Figure 2F:
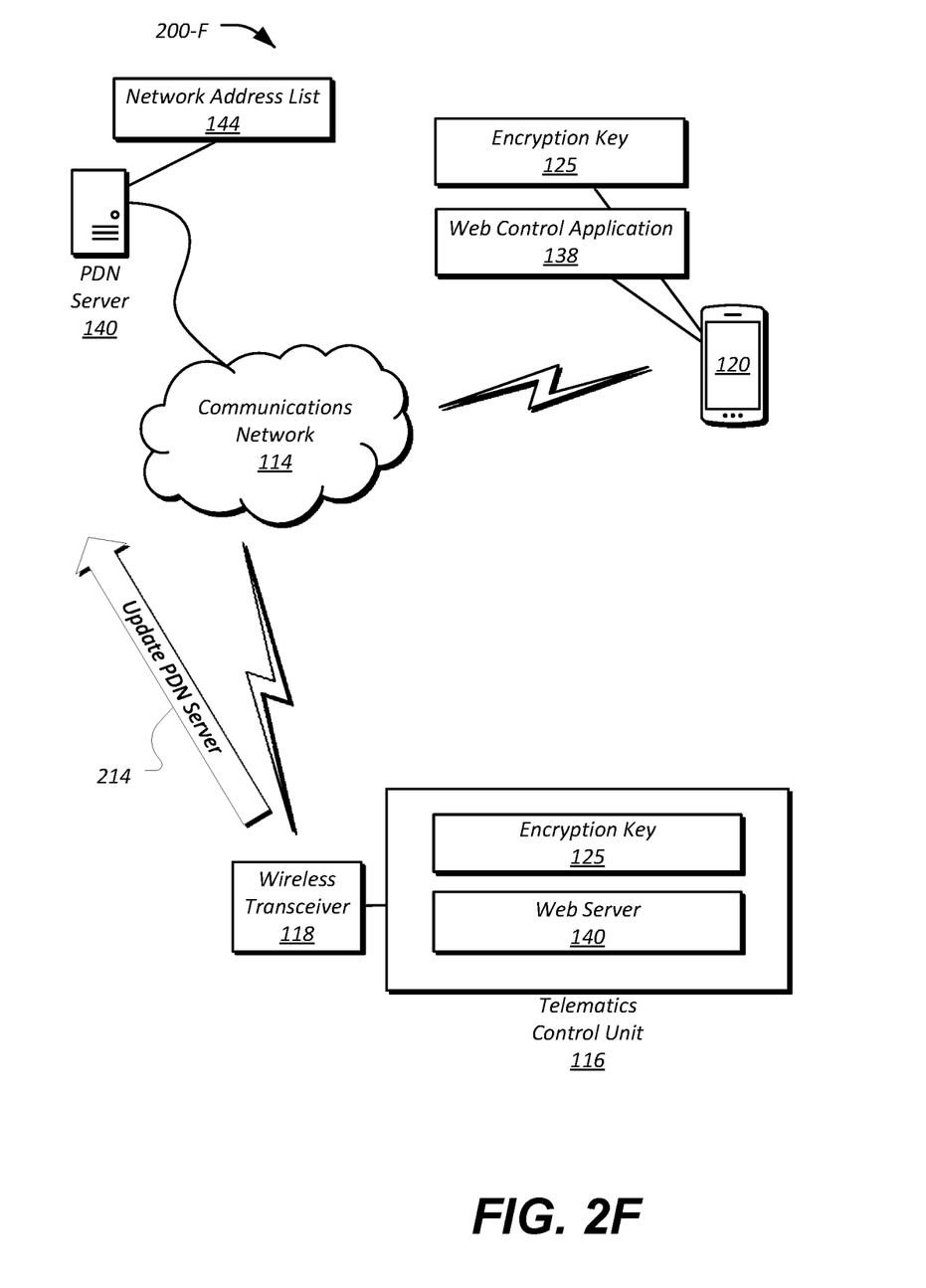
FIG. 2F illustrates an example diagram of the telematics control unit notifying the PDN server of the updated network address of the mobile device.

FIG. 2F illustrates an example diagram 200-F of the telematics control unit 116 sending an update message 214 to the PDN server 140 to update the network address list 144. Responsive to updating the paired device records as illustrated in the diagram 200-E, the telematics control unit 116 sends the update message 214 to the PDN server 140, e.g., using the wireless transceiver 118 via the communications network 114. In one example, the update message 212 may include the updated network address 137 of the mobile device 120. Additionally, in some examples the update message 212 may include the mobile device number of the mobile device 120. It should be noted that in some examples, the update message 214 may be encrypted, while in other examples the update message 214 may not also require encryption. In implementations that encrypt the update message 214, the update message 214 may be encrypted using a key stored to the vehicle 102, and decrypted using a key stored to the PDN server 140 (e.g., using symmetric or asymmetric encryption schemes). Accordingly, the PDN server 140 may be updated with new mobile device 120 address, so that the mobile device 120 can initiate IP traffic through the PDN server 140 to the vehicle 102.

Figure 2G:
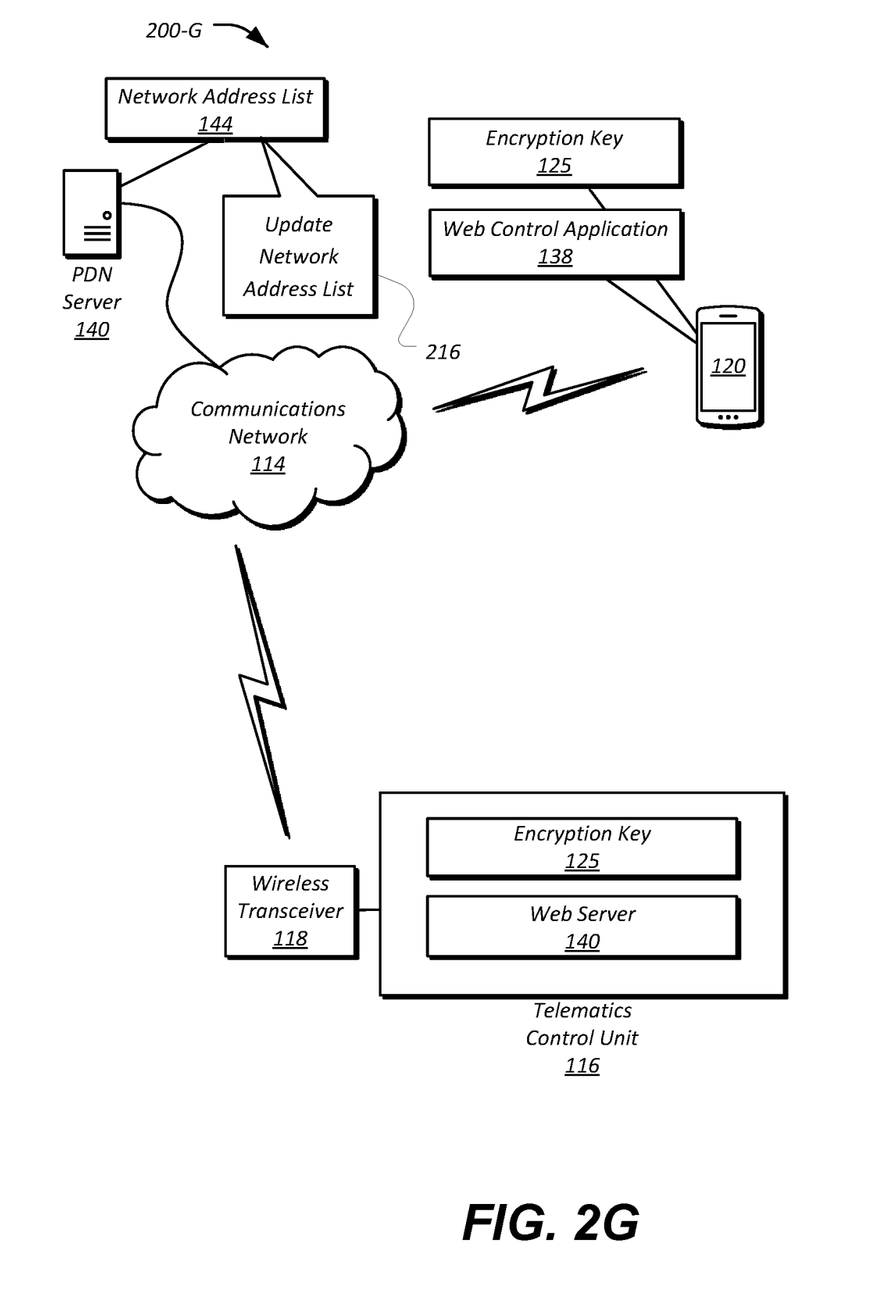
FIG. 2G illustrates an example diagram of the PDN server updating the network address list with the updated network address of the mobile device.

FIG. 2G illustrates an example diagram 200-G of the PDN server 140 updating the network address list 144 of the updated network address 137 of the vehicle 102. As an example, responsive to the receipt of update message 214, the PDN server may update 216 the network address list 144 by replacing the previous network address 137 of the mobile device 120 with the updated version.

Figure 3:
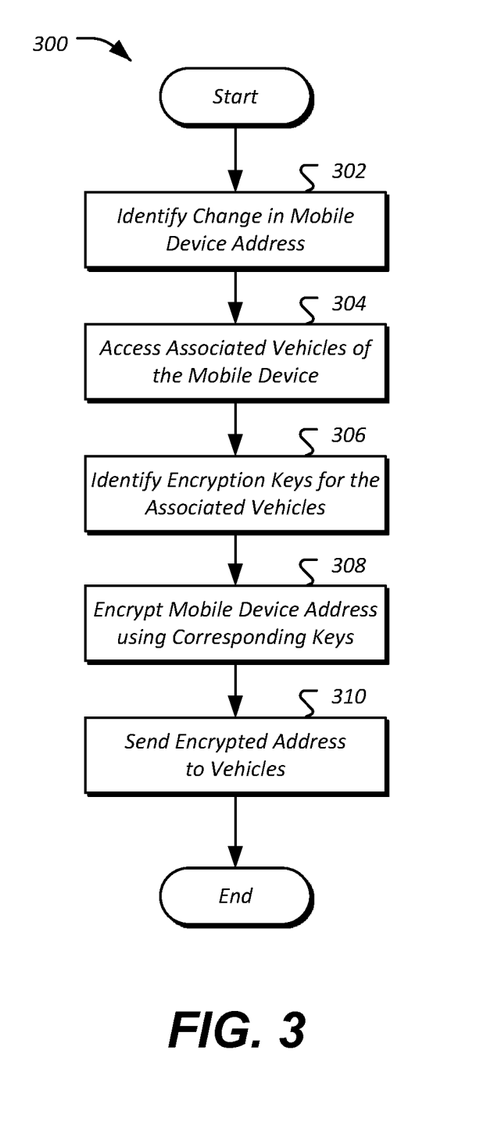
FIG. 3 illustrates an example process for providing mobile device addresses to a telematics control unit.

FIG. 3 illustrates an example process 300 for providing mobile device addresses 137 to a telematics control unit 116. In an example, the process 300 may be performed by the mobile device 120.

At operation 302, the mobile device 120 identifies a change in the mobile device address 137 of the mobile device 120. The change may be a result of various events. In one example, a change of the network address 137 may result from the mobile device 120 entering roaming mode. In another example, a change of network address 137 may result from the mobile device 120 connecting to a Wi-Fi or other network. To identify the change, the mobile device 120 may query the current network interface status of the transceiver 128 to determine whether the network address 137 has changed. The querying may be performed periodically (e.g., every minute, every second, etc.) or responsive to various events (e.g., after a predetermined timeout has expired, after a predetermined distance has been traveled, etc.). In another example, the mobile device 120 may set up a notification callback with the transceiver 128, and may receive a callback notification responsive to the network address 137 having been changed. An example identification is illustrated above with respect to FIG. 2A.

At 304, the mobile device 120 identifies paired vehicles 102 from the vehicle associations 127. In an example, the mobile device 120 may access the entries in the vehicle associations 127 for each vehicle 102 with which the mobile device 120 has previously been paired to identify any vehicles 102 to be updated with the new mobile device address 137. As one possibility, the vehicle associations 127 may identify the vehicles 102 according to vehicle identifiers as well as the phone numbers of the vehicles 102.

At operation 306, the mobile device 120 identifies encryption keys 125 for each of the associated vehicles 102. Each paired vehicle 102 may be associated with an encryption key 125, e.g., that was provided from the vehicle 102 during pairing. In an example, for each of identified paired vehicles 102 from operation 604, mobile device 120 may retrieve these encryption keys 125 to be used to encrypt the mobile device address 137 for the corresponding identified paired vehicles 102. As one possibility, the encryption keys 125 may be indexed according to vehicle identifier, and the mobile device 120 may retrieve identify the vehicles 102 using the identified vehicle identifiers.

At operation 308, the mobile device 120 encrypts the network address 137. In an example, the mobile device 120 encrypts the new mobile device address 137 for each of the identified paired vehicles 102 using the corresponding encryption key 125 retrieved at operation 606. An example is illustrated above with respect to FIG. 2B.

At operation 310, the mobile device 120 sends the updated network address 137 to the identified vehicles 102. For instance, the mobile device 120 may send notification messages 206 (e.g., via binary SMS 208 messages created at operation 308) to the phone numbers of each of the associated telematics control units 116 identified at operation 304. An example is illustrated above with respect to FIG. 2C. After operation 310, the process 300 ends.

Figure 4:
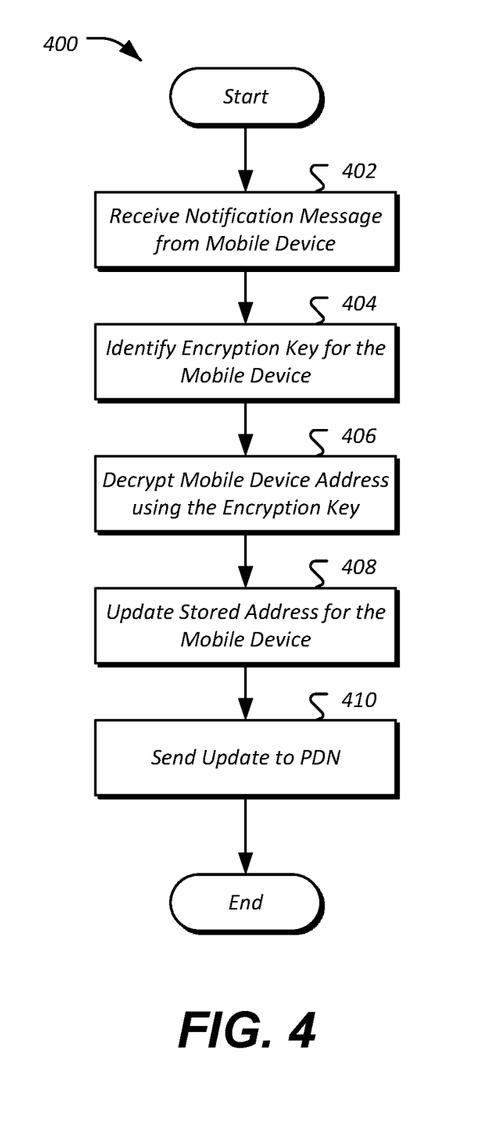
FIG. 4 illustrates an example process for updating paired device data of a telematics control unit based on receipt of an updated mobile device address.

FIG. 4 illustrates an example process 400 for updating paired device data 126 of a telematics control unit 116 based on receipt of an updated mobile device address 137. In an example, the process 400 may be performed by the firewall 124 and/or web server 138 of the mobile device 120.

At operation 402, the vehicle 102 receives a notification message 206 from a mobile device 120 including an encrypted updated mobile device address 137 for the mobile device 120. In an example, the message may have been sent as discussed above with respect to operation 310 and FIG. 2C.

At operation 404, the vehicle 102 identifies an encryption key 125 for use in decrypting the message. In an example, the telematics control unit 116 identifies the origin phone number from the notification message 206 received at operation 702, and retrieves the encryption key indexed according to the identified phone number.

At operation 406, the vehicle 102 decrypts the message using the encryption key 125. In an example, the telematics control unit 116 may utilize the encryption key 125 identified at operation 404 to decrypt the notification message 206. An example is illustrated above with respect to FIG. 2D.

At operation 408, the vehicle 102 updates the paired device data 126 network address information for the mobile device 120. Responsive to decrypting the notification message 206 at operation 706, the telematics control unit 116 updates 212 paired device data 126 to include the new network address 137 of the mobile device 120. An example is illustrated above with respect to FIG. 2E.

At operation 410, the vehicle 102 sends the updated network address 137 of the mobile device 120 to the PDN server 140 to update the network address list 144 responsive updating paired device data 126. The telematics control unit 116 may send the update message using the wireless transceiver 118 via the communications network 114 to the PDN server 140. Since the message is sent from the telematics control unit 116, the network address of which is saved to the network address list 144, this communication may be deemed as safe and the PDN server 140 may accept this message. After operation 410, the process 400 ends.

Figure 5:
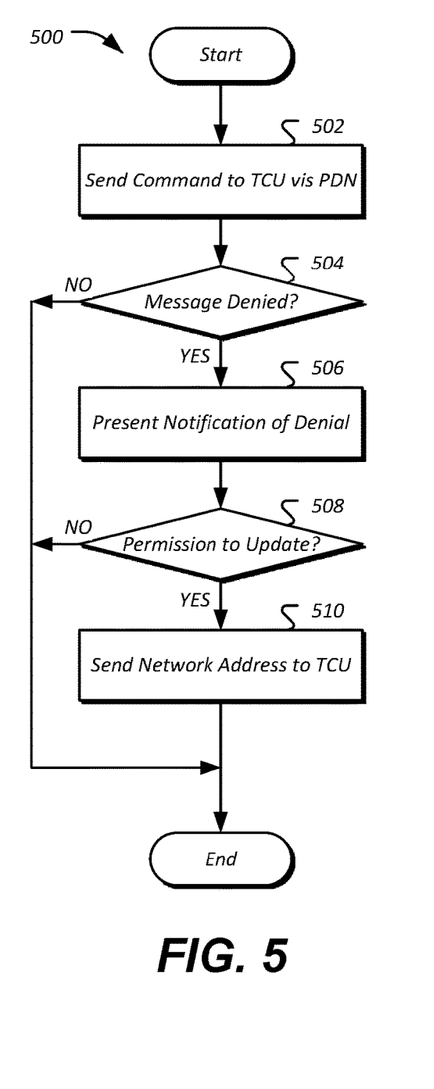
FIG. 5 illustrates an example process for requesting to update the network address list of the PDN server.

FIG. 5 illustrates an example process 500 for requesting to update the network address list 144 of the PDN server 140 according to an embodiment of the present disclosure. In an example, the process 500 may be performed by the mobile device 120 of the user.

At operation 502, the mobile device 120 sends a command to the telematics control unit 116 of the vehicle 102. The command may be, for example, a door lock or door unlock command.

At operation 504, the mobile device 120 determines whether the command is denied. In many examples, the PDN server 140 may validate the network address 137 of the mobile device 120, and may pass the command to the telematics control unit 116 of the destination vehicle 102. In other cases, the data traffic 142 containing the command may be denied by the PDN server 140. The PDN server 140 may return a denial message back to the mobile device 120 indicating the network address 137 of the mobile device 120 is not found in the network address list 144 of the PDN server 140. If such a denial message is received by the mobile device 120, meaning the command is not passed from the PDN server 140 to the telematics control unit 116, the mobile device 120 passes control to operation 506. Otherwise the command succeeds and the process 500 ends.

At 506, the mobile device 120 notifies the user of the failed command. In an example, the mobile device 120 may display a message on its display indicating that the attempt to send the command has failed, and prompting the user for permission to update the network address list 144 of the PDN server 140. Notably, since the current network address 137 of the mobile device 120 does not match what is currently stored in the network address list 144, the PDN server 140 will not accept messages such as updates sent from the mobile device 120; thus, the telematics control unit 116 is used to perform the update.

At operation 508, the mobile device 120 receives input indicative of whether to grant or deny permission to update the network address list 144 of the PDN server 140. In an example, if the user does not want to update at this time, he/she may choose to deny the update permission and the process 500 ends. If, however, the user chooses to grant permission to update the network address list 144, the process 500 continues to operation 510. It is noted that in some examples operations 506 and 508 are optional, and the mobile device 120 may automatically attempt the update without obtaining further user permission. For instance, the user may have opted into allowing such updates to be automatically performed.

At operation 510, the mobile device 120 encrypts the network address 137 and sends the encrypted notification to the telematics control unit 116 of the vehicle 102. The encrypted notification may be sent as an SMS, for instance, which is not Internet traffic and does not pass through the PDN server 140. Responsive to receiving the notification, the telematics control unit 116 decrypts the notification and updates the paired device data 126 record and the PDN server 140 accordingly. Further aspects of the update processing of operation 510 are discussed above with respect to the process 400. After operation 510, the process 500 ends.

Figure 6:
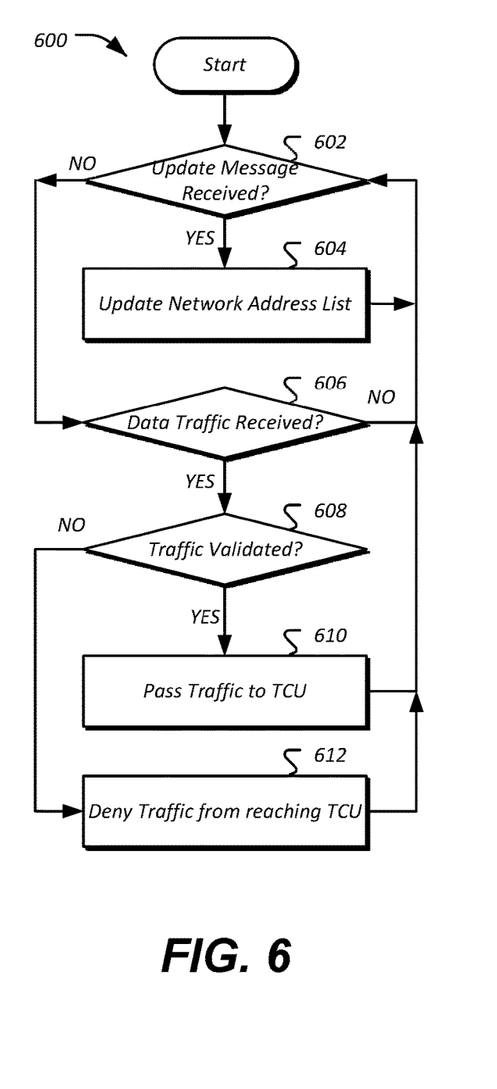
FIG. 6 illustrates an example process for operation of the PDN server.

FIG. 6 illustrates an example process 600 for operation of the PDN server 140. At operation 602, the PDN server 140 determines whether an update message is received from a vehicle 102. In an example, an update message may be received as described above with respect to operation 410. If so, control passes to operation 604. Otherwise, control passes to operation 606.

At operation 604, the PDN server 140 updates the network address list 144 of the updated network address 137 of the vehicle 102 responsive to the receipt of the update message. The PDN server may update the network address list 144 by replacing the previously-stored network address 137 of the mobile device 120 with the updated version. Alternatively, the updated network address 137 may be stored in addition to the previous version, and therefore in case that the mobile device rolls back to the previous version of network address 137, there is no need to re-update the network address list. After operation 604, control returns to operation 602.

At operation 606, the PDN server 140 determines whether data traffic 142 is received. In an example, the PDN server 140 may have received a command from a mobile device 120, such as discussed above with respect to operation 502 of the process 500. If so, control passes to operation 608. Otherwise, control returns to operation 602.

At operation 608, the PDN server 140 validates the data traffic 142 according to the network address list 144. In an example, responsive to receiving the data traffic 142, the PDN server 140 authenticates the data traffic 142 by comparing the network address 137 of the mobile device 120 with addresses stored in the network address list 144. For instance, the PDN server 140 may identify whether the originating address of the request matches a network address 137 specified on the network address list 144 as being associated with the telematics control units 116 destination of the data traffic 142. If a match is found, control passes to operation 610. If, however, the PDN server 140 fails to find a match in the network address list 144, control passes to operation 612.

At operation 610, the PDN server 140 allows the data traffic 142 to pass through to the vehicle 102 destination, e.g., the telematics control unit 116. After operation 610, control returns to operation 602.

At operation 612, the PDN server 140 denies the data traffic 142 from passing through to the vehicle 102 destination. The PDN server 140 may further send a notification of denial of the passage of the data traffic 142 to the originating mobile device 120, as discussed above with respect to operation 504. After operation 612, control returns to operation 602.

In general, computing systems and/or devices, such as the controllers 106, telematics control unit 116, mobile device 120, firewall 124, and PDN server 140 may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices, such as the controllers 106, telematics control unit 116, mobile device 120, firewall 124, and PDN server 140 generally include computer-executable instructions that may be executable by one or more processors of the computing devices. Computer-executable instructions, such as those of the web control application 136, may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire, and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the data stored by the PDN server 140, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the controllers 106, telematics control unit 116, mobile device 120, firewall 124, and PDN server 140 may be such computer program products (e.g., the web control application 136). In some examples, these computer program products may be provided as software that when executed by one or more processors provides the operations described herein. Alternatively, the computer program products may be provided as hardware or firmware, or combinations of software, hardware, and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
a telematics control unit (TCU) of a vehicle programmed to:
receive a short message service (SMS) message from a phone number of a mobile device;
identify, from the message, an updated network address of the mobile device to use for data traffic addressed to or from the mobile device; and
send the updated network address of the mobile device to a packet data network (PDN) server configured to route the data traffic between the network address of the mobile device and the vehicle.

2. The vehicle system of claim 1, wherein the TCU is further programmed to:
maintain a list of mobile device identification numbers of devices paired to the TCU; and
responsive to receiving the SMS message, validate the phone number as corresponding to an authorized mobile device if the phone number is included in the list.

3. The vehicle system of claim 1, wherein the TCU is further programmed to update network filtering settings of the TCU with the updated network address associated with the phone number of the mobile device.

4. The vehicle system of claim 1, wherein the updated network address is sent from the TCU to the PDN as Internet Protocol data traffic.

5. The vehicle system of claim 1, wherein the SMS message is encrypted by the mobile device, and the TCU is further programmed to decrypt the SMS message.

6. The vehicle system of claim 5, wherein the TCU is further programmed to:
retrieve an encryption key indexed according to the phone number of the mobile device; and
utilize the encryption key to decrypt the SMS message.

7. The vehicle system of claim 1, wherein the mobile device is a cellular phone.

8. A system comprising:
a packet data network (PDN) server programmed to:
communicate over a data network with a telematics control unit (TCU) of a vehicle;

maintain, for the TCU, an association of identification numbers of mobile devices with corresponding network addresses of the mobile devices;

receive, from the TCU, an updated network address associated with an identification number of a mobile device; and update the association with the updated network address of the mobile device.

9. The system of claim 8, the PDN server being further programmed to pass incoming traffic to the TCU responsive to an incoming network address of the traffic being included in the association for the TCU.

10. The system of claim 8, wherein the updated network address is encrypted, and the PDN server is further programmed to decrypt the updated network address.

11. A method for updating a network address of a mobile device on a server comprising:

receiving, by a telematics control unit (TCU), a message sent from a mobile device;

processing the message by the TCU to obtain an updated network address associated with an identification number of the mobile device; and sending the updated network address from the TCU to the server, to provide the server with the updated network address of the mobile device.

12. The method of claim 11, further comprising:

maintaining in a storage of the TCU a list of mobile device identification numbers of devices paired to the TCU; and responsive to receiving the message, validate the identification number as being of an authorized mobile device when the identification number is included in the list.

13. The method of claim 11, further comprising updating network filtering settings of the TCU with the updated network address associated with the identification number of the mobile device.

14. The method of claim 11, further comprising receiving the message from the mobile device over short message service (SMS).

15. The method of claim 11, wherein the message is encrypted by the mobile device, and further comprising decrypting the message by the TCU.

16. The method of claim 15, further comprising:

accessing a plurality of stored encryption keys to retrieve an encryption key indexed to the identification number of the mobile device; and utilizing the encryption key to decrypt the message.

17. The method of claim 11, wherein the updated network address of the mobile device is sent to the server as Internet Protocol data traffic.

18. The method of claim 11, wherein the mobile device is a cellular phone.

19. The method of claim 11, wherein the identification number is a mobile device number.

* * * * *